Figure 1:
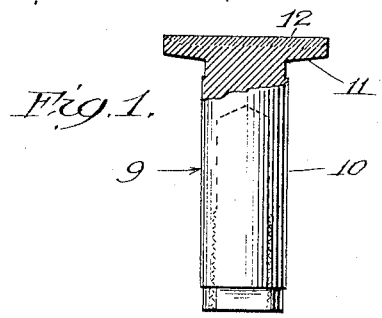

May 17, 1927.  G. R. RICH  1,628,911

ELECTRICALLY WELDED VALVE TAPPET

Filed Nov. 5, 1926

Inventor;
George R. Rich,
by Charles O. Shervey,
his Atty.

Patented May 17, 1927.

1,628,911

UNITED STATES PATENT OFFICE.

GEORGE R. RICH, OF BATTLE CREEK, MICHIGAN.

ELECTRICALLY-WELDED VALVE TAPPET.

Application filed November 5, 1926. Serial No. 146,313.

This invention relates to composite metal articles of manufacture and process in the manufacture of the same, and its principal object is the production of articles of manufacture composed of steel and iron integrally united in a homogeneous like mass. Another object is the production of composite articles of manufacture composed of a steel body having a white iron facing integrally united therewith so as to form a homogeneous like mass.

It is well known that articles of manufacture, such as automobile valve tappets, valves and other parts of automobile engines require a tough, strong body portion and a hard wear resisting facing or surface portion, at least on certain parts thereof as for instance on the head of tappets and on the bearing face of valve heads, that there is a great need at the present time for such articles of manufacture and many experiments and attempts have been made to produce such an article at a cost which would not be prohibitive, but without much of any success.

As an example, it is well known that considerable difficulty has been encountered in providing a valve tappet capable of successfully withstanding the wear on the bearing face of its head, due to the friction caused by the cam in passing over it. This is particularly noticeable in high speed motors where the abrasive action is more severe than in low speed motors. With medium or low priced motors the better types of tappets are prohibitive on account of the cost thereof, and for this as well as other reasons, many attempts have been made to furnish a practical wear resisting tappet that can be made and sold at a price acceptable to motor manufacturers.

It is well known that a tappet having a cast iron bearing face for the head is particularly advantageous because of the wearing properties of cast iron, but the great difficulty in manufacturing a valve tappet formed of a steel shank and a cast iron head or bearing face for the head, is that of integrally uniting the cast iron portion with the steel body of the tappet into a homogeneous like mass, so that the two may withstand the vibrations and strains and remain permanently united. Another serious difficulty has been that of forming such a union between the two metals economically.

In the course of my experiments I have produced a composite metal valve tappet formed of a steel body and a white iron facing for the bearing portion of the head thereof. I have found that by fusing a bar or stick of cast iron to the body of the tappet by the electric arc welding process, and by subjecting the fused together parts to a temperature of more than six thousand degrees Fahrenheit for a predetermined number of seconds that much of the carbon, silicon and other impurities are burned out of the cast iron, leaving a substantially pure, white iron, integrally united with the steel body portion in a homogeneous like mass.

This invention consists, therefore, in a composite metal article of manufacture, the body portion of which is composed of steel and having a white iron facing thereon integrally united therewith to form a homogeneous like mass. It further consists in the process of producing a composite metal article of manufacture, which consist in fusing cast iron to a steel body portion of the article by the electric arc welding process, or gas welding process at a sufficient temperature and for a sufficient length of time to convert the cast iron into white iron, and integrally unite it with the steel to form a homogeneous like mass. The invention further consists in the several novel features hereinafter fully set forth and particularly defined in the appended claims.

Figure 2:
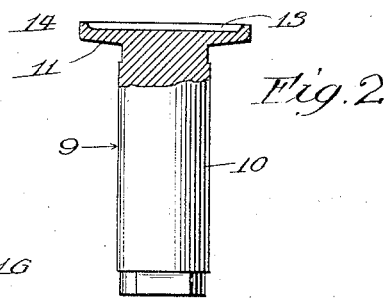
Figure 3:
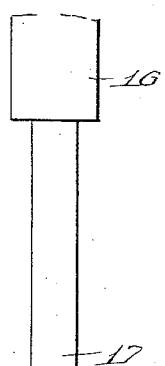
Figure 3:
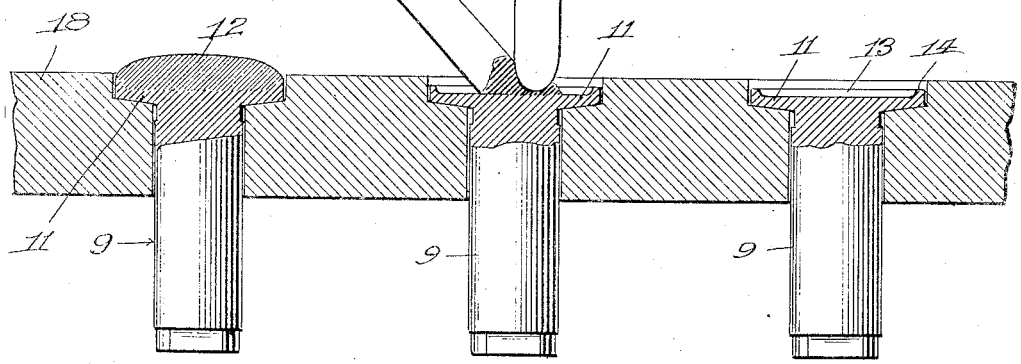
Figure 4:
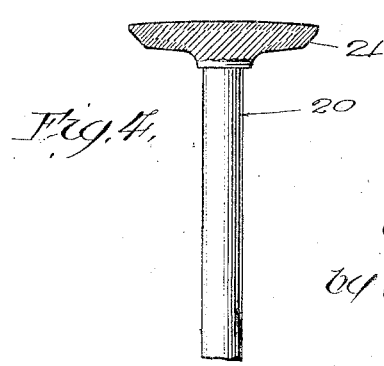

The invention is clearly illustrated in the drawing accompanying this specification, in which:

Fig. 1 is a view, partly in side elevation and partly in central longitudinal section, of a composite metal article of manufacture, such as a valve tappet, embodying a simple form of the present invention; Fig. 2 is a view, partly in side elevation and partly in central longitudinal section, of the valve tappet body seen in Fig. 1; Fig. 3 is a view, partly in side elevation and partly in vertical section, illustrating the process of producing composite metal articles embodying the present invention and Fig. 4 is a view, partly in side elevation and partly in central longitudinal section showing the application of the invention to a poppet valve.

Referring to said drawing and first to Figs. 1 and 2, which illustrate a simple embodiment of the invention applied to a valve tappet, the reference character 9 designates the body portion of the tappet, 10 the steel shank or stem portion thereof, 11 the head portion and 12 the iron facing or bearing face portion of the head. The tappet shank may be made hollow if desired and as shown in Fig. 1 the shank or stem portion 10 is bored out and tapped for the reception of the adjustment stud. The end of the shank or stem portion is flattened as usual for the reception of a wrench or other tool used in adjusting the adjustment stud as is well understood.

In practice the shank or stem portion 10 and head portion 11 of the rough piece body portion 9, (see Fig. 2) are usually formed up from a bar or rod of steel in a power hammer or power press, provided with suitable heading dies, and after the rough piece has been formed it is rough machined and the shank is bored and tapped and if desired or thought desirable a shallow recess or cavity 13 is formed in its bearing face portion leaving a thin rim 14 around the recess. The iron bearing face portion 12 of the head is integrally united with the body portion 9, during the process of welding the one metal to the other and in said process the cast iron, from which the bearing face portion is formed, is converted into white iron having a reduced carbon content and substantially free from silicon and other impurities.

In carrying out the process of producing composite metal tappets embodying the present invention, cast iron, preferably in the form of a stick or bar of cast iron (ordinary No. 2 foundry iron) is used, a fragment of which is shown at 15 in Fig. 3, and an electric arc welding tool, a fragment of which is shown at 16, is employed for fusing or melting the stick of cast iron, fusing the molten mass to the body portion of the tappet and burning out excess carbon, silicon and impurities, thereby converting the cast iron into white iron. A graphite stick 17 is preferably used in the electric arc welding tool instead of a carbon stick as I find that I am able to obtain a higher temperature with the use of a graphite stick and this is very essential to the process. In the actual production of tappets I have found that by maintaining a voltage of sixty volts at one hundred to three hundred amperes, depending upon the size or mass of material, very successful results are obtained.

In the process, several of the rough machined tappet pieces (similar to the one shown in Fig. 2) are set in countersunk holes formed in a plate 18, (see Fig. 3) such as a carbon plate, for instance. The workman places the end of a stick of cast iron 15 on the middle portion of the top of the head of one of the rough tappet pieces and applies the graphite stick of the electric arc welding tool to the end of the cast iron stick thereby heating the same to a fusing or melting temperature and at the same time heating the top surface portion of the rough tappet piece. Enough cast iron is melted away from the cast iron stick to completely cover the head of the rough tappet piece, and the graphite stick of the welding tool is moved around on top of the head of the tappet piece to heat the same to a fusing temperature, and because of the continued application of the intense heat from the electric arc welding tool, the metal which has flowed from the cast iron stick, and the metal of the rough tappet piece are fused together into one integral mass. By continuing the application of the intense heat for a few seconds, and by moving the graphite stick around in the molten mass, the excess carbon and the silicon and other impurities are burned out of the cast iron thereby converting the cast iron into white iron. The operator passes from one tappet body to another in the plate and treats each one in the same manner. In Fig. 3 is graphically illustrated the act of fusing the cast iron to the middle tappet piece. The piece at the left thereof has been faced with the iron facing and heat treated. The piece at the right has not been treated. After the pieces have been formed as above described, they are rough machined and tested for hardness. I find that if constructed in accordance with the method just described the rough pieces will show a reading of from forty-five to fifty Rockwell, which shows that the cast iron has been converted into white iron.

My experiments have shown that the iron, when treated as above, has been brought into a condition in which its hardness may be increased materially if desired. Consequently after the pieces have been rough machined their hardness may be increased by further heat treatment. By subjecting them to a temperature of approximately 1,680 degrees Fahrenheit and quenching them in oil they develop a hardness of 60 Rockwell. To relieve them of any internal strains, resulting from the previous treatment, the pieces may be tempered, either in a hot air furnace or by an oil bath process. I have found that they may be tempered by heating them up to approximately 450 degrees Fahrenheit. The rough pieces are then finished by grinding the surfaces to size which require finishing.

In my experiments I have found that in welding cast iron to steel with the electric arc welding process, unless the required voltage and amperage is used and the heat treatment carried on for the necessary length of time, the characteristics of the cast iron will not be changed materially, but that when the proper voltage and amperage is used and the heat treatment is carried on for a sufficient length of time, the excess carbon, silicon and other impurities will be burned out of the cast iron, thereby converting it into a white iron, integrally united with the body portion in a homogeneous like mass. It has also been found that the steel of the stem is not injuriously affected by the application of the extreme heat, but that the iron head portion becomes very hard. When broken open it is found that the steel structure below the iron facing is very tough and acts as a reinforcement for the harder iron part. When broken open the cast iron cracks freely, but the steel being more tenacious clings together and forms the tough body portion for the facing.

In Fig. 4 is illustrated an application of the invention to a poppet valve 20 where the bearing face portion 21 is composed of white iron and the remainder of steel integrally united by the present process. While the invention has been described in connection with these two articles it is to be understood that it may be applied to any metal article, which requires a steel body and a facing of harder material, such as iron, integrally united thereto.

This composite metal article is not to be confused with any article of manufacture in which a separate previously formed cast iron facing is welded to the body. Such expedients are not practical and their usefulness is short lived. Furthermore the material used for forming the white iron facing is not to be confused with ordinary iron sticks employed in electric arc welding, but the material used is cast iron preferably that commonly known as No. 2 foundry iron.

It is my belief that a new art in the formation of composite metal articles of iron and steel has been opened up with my experiments, one that has not been accomplished in any other way.

While the electric arc welding process has been described as the preferred one for developing the intense heat required to change the characteristics of cast iron into white iron and fuse it to steel bodies, I desire not to limit myself to the same, but wish to be understood as intending to cover in certain of the appended claims, the use of any process for obtaining the necessary heat to accomplish the same result.

Valve tappets and other articles containing the present invention can be made economically, they are practical and very serviceable, and the tappets have been found to be more efficient than any others now on the market, which can be manufactured and sold at a price in competition with the present one. Other articles made in accordance with the present invention will be found to contain the same valuable characteristics.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A composite metal article of manufacture, comprising a steel shank having a steel seating surface, and a white iron crown electrically deposited on said steel seating surface.

2. A composite metal valve tappet, comprising a steel shank having a steel seating surface, and a white iron crown electrically deposited on said steel seating surface.

3. The herein described process in the production of composite metal valve tappets, which consists in electrically depositing cast iron over the entire steel seating face portion of the steel tappet body to form a white iron crown on said steel seating face portion.

GEORGE R. RICH.